Figure 11:
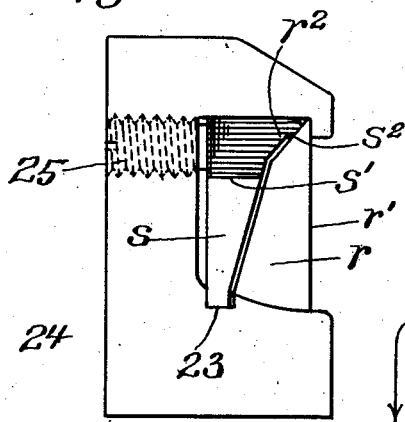

J. HARTNESS.
CUTTER FOR METAL WORKING TOOLS.
APPLICATION FILED SEPT. 12, 1908.
1,021,868.
Patented Apr. 2, 1912.
2 SHEETS—SHEET 1.
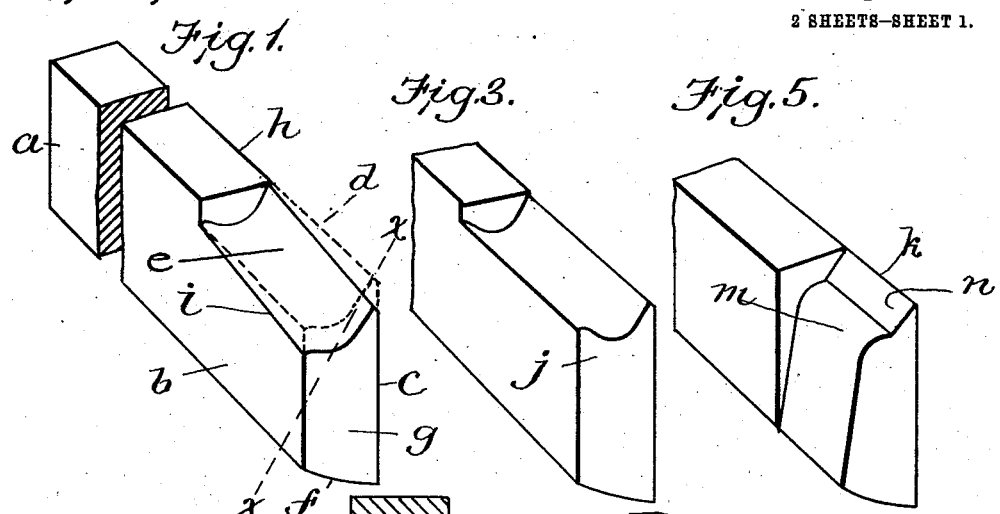
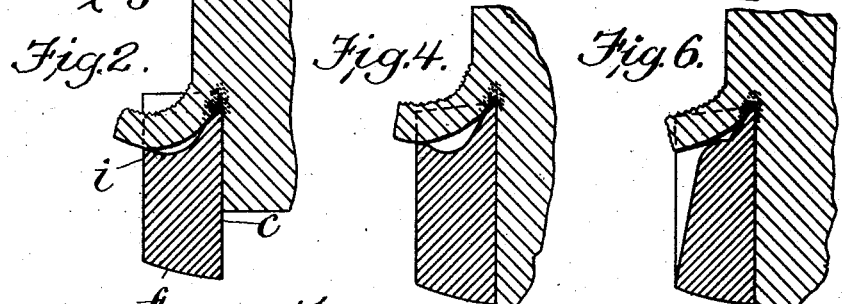
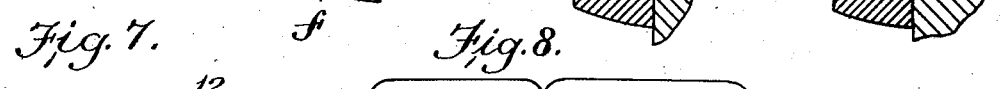
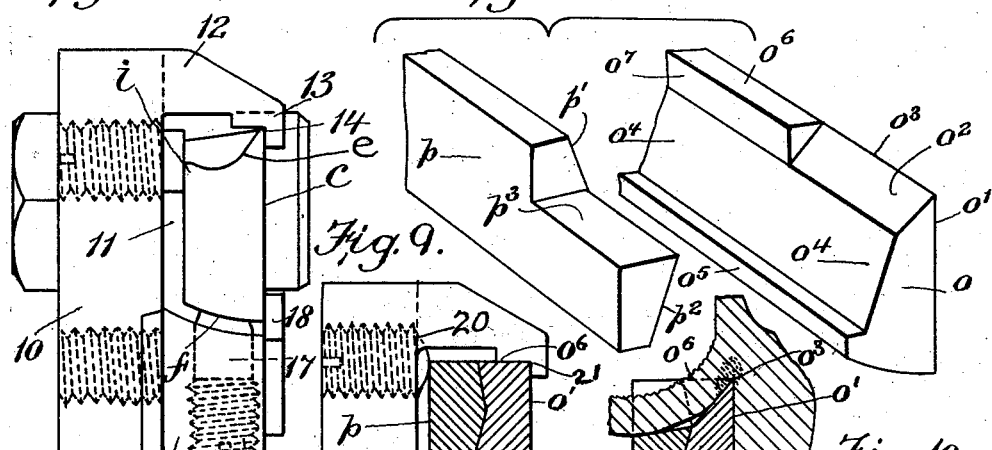

J. HARTNESS.
CUTTER FOR METAL WORKING TOOLS.
APPLICATION FILED SEPT. 12, 1908.

1,021,868.

Patented Apr. 2, 1912.

2 SHEETS—SHEET 2.

Witnesses:
F. R. Ronlstone
P. H. Pezzetti

Inventor
James Hartness
by Wright Brown Dunby May
attys

UNITED STATES PATENT OFFICE.

JAMES HARTNESS, OF SPRINGFIELD, VERMONT.

CUTTER FOR METAL-WORKING TOOLS.

1,021,868.  Specification of Letters Patent. Patented Apr. 2, 1912.

Application filed September 12, 1908. Serial No. 452,796.

*To all whom it may concern:*

Be it known that I, JAMES HARTNESS, of Springfield, in the county of Windsor and State of Vermont, have invented certain new and useful Improvements in Cutters for Metal-Working Tools, of which the following is a specification.

This invention has relation to tools for turning metal.

In my copending application, Serial No. 406,588, filed December 16, 1907, I have shown that, while the ideal instrumentality for cutting chip from the face of the work is a wedge, yet heretofore it has never been the practice to utilize the same, for the reason that it has always been deemed essential to so construct, and hold a machine controlled cutter as to provide a clearance between the face of the cutter and the face of the work. I have further pointed out that, as a result of the clearance, the pressure upon the cutting edge, is one-sided, and consequently to meet the tremendous unbalanced pressure, the lip angle is necessarily greater than 45° nearly always approximating 65°, so that with a clearance of 10° and a top slope of 15°, the top face of the tool stands at about an angle of 75° to the face of the work from which a chip is to be removed. I have further shown that by forming the tool with two faces at an acute or wedging angle, and holding the inner face against the face of the work, the pressure upon the two faces is equalized, the strain upon the cutting edge being wholly a compression strain. I have found further, that in splitting off a chip, in the use of a wedge shaped cutter (instead of scraping or crushing it off with a cutter as heretofore constructed), I can reduce the work of the cutting edge materially, by forming the cutter with an additional wedging portion, which engages the inner face of the chip and wedges it outward so that the work of lifting the chip from the face of the metal is taken away from the extreme cutting edge, and the friction of the moving metal is borne by another part of the tool.

The present invention therefore consists in a cutter comprising two faces at an acute angle to form a cutting edge, and a rib having a surface at an angle to the outer face to receive the chip thereagainst so as to wedge or lift it outward. Since the use of the wedge-shaped cutter permits the removal of a heavy tough chip, the wedging action of the rib tears open the metal at the cleavage point or at the line of the cutting edge. It is not essential that the two faces of the tool should be continued until they meet at a sharp edge, as the "edge" so called may be blunt or flattened as will be explained. It is quite apparent that it is not essential that the rib should form an integral part of the cutter, although in some cases, it is desirable to have the rib formed as a part of the cutter bar. The rib may be formed separately and secured to the bar with its active surface in proper relation to the extreme cutting edge. In this case, the rib would, in the event of the oscillation of the cutter, move in unison with it. On the other hand, it is at times advantageous to form the rib separately from the cutter and hold it against movement, at the same time permitting the cutter itself to oscillate more or less relatively thereto. In the latter case, the rib may further serve as a clamp for holding the cutter in its proper position in a holder.

Figure 12:
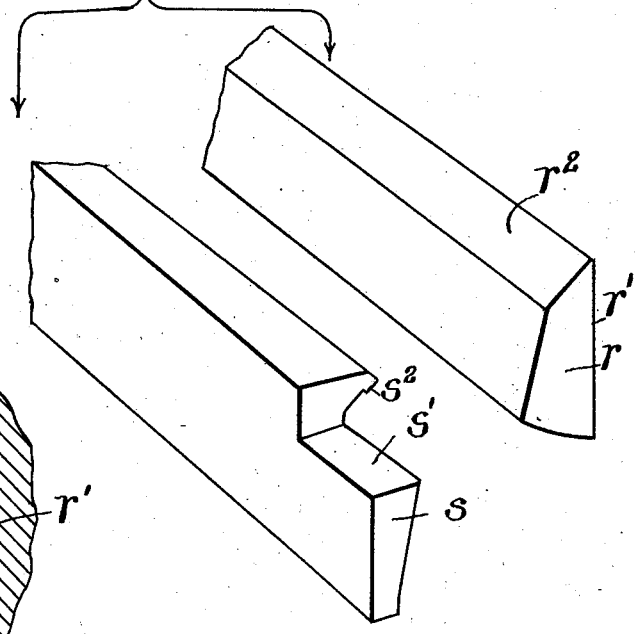
Figure 13:
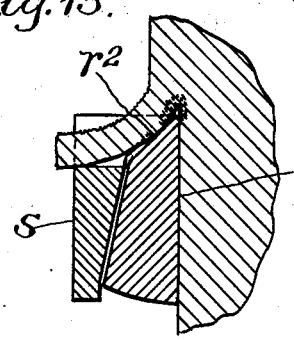

Referring to the accompanying drawings, Figure 1 represents in perspective view a portion of a cutter constructed in accordance with the invention. Fig. 2 illustrates the operation of the cutter on the work. Figs. 3 and 4 represent another form of cutter and its operation on the work. Figs. 5 and 6 represent still another form of cutter and its operation in removing a chip. Fig. 7 represents an end view of a complete tool having the cutter shown in Fig. 1. Figs. 8 to 10 inclusive illustrate an embodiment of the invention in which the cutter is formed in two parts or sections. Figs. 11 to 13 inclusive, illustrate still another embodiment of the invention.

Reference may be had to my copending applications Serial No. 406,588 filed December 16, 1907, and Serial No. 452,308, filed September 9, 1908, for a complete description of the manner in which the cutters to be described may be mounted in their holders.

In Fig. 7, I have shown in end elevation, a simple form of tool in which the holder 10 has a groove 11 for the reception of the cutter. The upper wall 12 of the groove is provided with a downwardly projecting flange 13 which is rabbeted as at 14 to provide a reëntrant corner to receive one of the corners of the cutter. Passed upward through the lower wall 15 of the groove, are one or more screws 16 and pins 17 which support the cutter. The cutter may oscillate to a limited extent about an axis coincident with said corner line, and to hold it against outward dislocation, I employ a lock indicated at 18.

The cutter is illustrated upon the drawings as consisting of a bar having a shank portion $a$ and a cutting end $b$. The inner face $c$ of the bar is preferably flat so that it may rest flatly against the face of the work without clearance. The cutting edge which is indicated at $d$, is formed by the face $c$ and by a face $e$ which is at an acute angle thereto of about 30° so that, when the cutter is presented to the work, the face $e$ lies at a wedging angle to the metal of the work to be removed. The bottom of the bar $a$ is convex, being a segment of a cylinder which would be formed by moving a plane of the width of the face $c$ about an axis coincident with the cutting edge as indicated at $f$. The end face $g$ of the cutter is shown as flat, but it will be understood that it may be curved or may be at an inclination. The cutting edge $d$ may be a continuation of the corner $h$ of the shank, as indicated in dotted lines, but preferably the corner and the edge are not in exact alinement as the cutting edge $d$ is inclined as illustrated in full lines in Fig. 1. When the cutter is placed in the holder shown in Fig. 7, the convex bottom $f$ rests upon a seat, as for instance upon the pins 17, the corner $h$ of the shank being located in the reëntrant angle 14 which serves as a fulcrum therefor so as to permit the cutter to oscillate more or less about a line coincident with said corner $h$.

It will be noted that the face $e$ of the cutter instead of continuing along the plane of the dotted line $x$—$x$ in Fig. 1, curves outwardly so as to form a rib $i$. When the cutter is brought into proper relation to the work, the face $c$ bears against the face of the work as shown in Fig. 2, so that the pressure of the chip against the face $e$ and the pressure of the work against the face $c$ are practically equalized as pointed out in my previous application hereinabove referred to. As the chip is wedged outwardly from the face of the work, it engages the rib $i$ which lifts the chip and tends to split the metal of the work in advance of the cutting edge as shown in Fig. 2. In actual practice, tools as constructed according to Fig. 1, bear evidence that the chip does not wear the top slope between the cutting edge and the rib $i$, since the labor is divided between the extreme cutting edge and the rib.

It should be understood that the employment of a cutter having an acute cutting edge, causes the separation of a chip of comparatively great lateral strength. A chip of this character may impart an important lifting stress, as it rides over the rib, to the metal at the point of cleavage, and consequently the rib assists in separating the chip from the work, and relieves the cutting edge from a part of its duty. This function is performed by a part of the cutter, which is so remote from the extreme cutting edge, that the wear and the heat generated by the friction are negligible in effect.

It is evident that the cutter may be constructed in a variety of ways. For instance, in Fig. 3, the rib which is here indicated at $j$ is much more pronounced than in Fig. 1, the concavity of the top slope being greater. In each of these two tools, the cutting edge is blunt. In Fig. 5, the cutting edge which is indicated at $k$ is sharp, and the rib $m$ is at a marked angle to the outer face $n$ which is substantially flat.

As previously indicated, it is not essential that the rib and the cutting edge shall be integral, for these two parts, treated as separate instrumentalities, may be separate from each other so long as they are maintained in proper relation. For instance, in Figs. 8 to 10 inclusive, I have shown a cutter which is formed in two parts. In this case the cutter consists of two sections which are indicated respectively at $o$ and $p$. The section $o$ has the faces $o'$ and $o^2$ which are approximately at an angle of 45° and which form the acute angle cutting edge $o^3$. The section $o$ has also another face $o^4$ at the lower edge of which is a flange $o^5$. The shank portion of the section $o$ has a top face $o^6$ and a face $o^7$ which is at an obtuse angle to the face $o^4$, so that a seat is formed for corresponding or complemental faces $p'$ $p^2$ of the section $p$. The face $p^2$ lies flat against the face $o^4$ and the forward portion of the section $p$ has a top face $p^3$ which, as shown in Fig. 10, lies at an obtuse angle to the top slope $o^2$ of the cutting edge. The forward end of the section $p$ constitutes a rib for lifting the chip. With this construction, the two sections of the cutter are placed in a holder 19 as shown in Fig. 9, which is substantially similar to that illustrated in Fig. 7. The bottom of the section $p$ fits against the flange $o^5$ and the screw 20 bears against the upper part of the section $p$ and holds it and the section $o$ in a reëntrant corner 21. In this case, the two sections of the tool oscillate together when the inner face of the cutting edge finds the face of the work.

In Figs. 11, 12 and 13, I have shown another construction in which two sections of the cutter $r$ and $s$ are formed separately. In this case the cutter has the inner face $r'$ and an outer face or top slope $r^2$ at an acute angle to form the cutting edge, and the bottom of the section is convex so as to rest upon a concave seat. The section $s$ has a forwardly projecting end with a top s' so as to constitute the rib. The section s is substantially in the shape of an inverted prism, its lower end being seated in a groove 23 in a holder 24, its inner face being separated from the confronting face of the section r so as to permit of a slight oscillation of the latter. The section s has, however, a narrow face $s^2$ which bears upon the upper portion of the section r so that by means of the adjusting screw 25, the section s may be utilized in holding the section r in proper position in the holder. As previously indicated, the rib is thus formed separately from the cutting edge, the section of the tool which forms the latter being more or less oscillatory relatively thereto.

From the foregoing, it will be observed that the rib which operates to assist in splitting the metal at the point of cleavage may be formed in a great variety of ways, all without departing from the spirit and scope of the invention.

While I have termed the projections i, j and m, "ribs" yet I do not intend by that word to limit the invention to the shapes thereof, since I believe that I am the first to have provided a tool with an element or instrumentality which I have termed a rib and which, employed in conjunction with a cutting edge having an acute lip angle, operates to relieve the cutting edge and to assist in splitting the metal at the line of cleavage.

Having thus explained the nature of my said invention and described a way of constructing and using the same although without attempting to set forth all of the forms in which it may be made or all of the modes of its use, what I claim is:—

An instrumentality for turning metal, comprising an elongated bar having an inner face and a top slope forming a wedge or acute angle of not more than substantially 45° terminating in a cutting edge extending lengthwise of the bar, and a rib parallel with the cutting edge and having a top face at an angle to said inner face to constitute a lifter for the chip produced by said cutting edge.

In testimony whereof I have affixed my signature, in presence of two witnesses.

JAMES HARTNESS.

Witnesses:
 Marcus B. May,
 P. W. Pezzetti.

---

Copies of this patent may be obtained for five cents each, by addressing the "Commissioner of Patents, Washington, D. C."